United States Patent [19]

Leger

[11]  4,419,423

[45]  Dec. 6, 1983

[54] NONAQUEOUS CELLS EMPLOYING HEAT-TREATED MNO₂ CATHODES AND A PC-DME-LiCF₃SO₃ ELECTROLYTE

[75] Inventor: Violeta Z. Leger, North Olmsted, Ohio

[73] Assignee: Union Carbide Corporation, Danbury, Conn.

[21] Appl. No.: 384,222

[22] Filed: Jun. 2, 1982

Related U.S. Application Data

[63] Continuation of Ser. No. 163,497, Jun. 27, 1980, abandoned.

[51] Int. Cl.³ .............................................. H01M 6/14
[52] U.S. Cl. ................................... 429/197; 429/199; 429/224
[58] Field of Search ................ 429/197, 194, 224, 199

[56] References Cited

U.S. PATENT DOCUMENTS

| | | | |
|---|---|---|---|
| 3,844,837 | 10/1974 | Bennien et al. | 136/6 LN |
| 4,071,665 | 1/1978 | Garth | 429/197 |
| 4,133,856 | 1/1979 | Ikeda | 429/224 X |
| 4,158,722 | 6/1979 | Lauck et al. | 429/194 |
| 4,158,723 | 6/1979 | Gabano et al. | 429/197 |
| 4,160,070 | 7/1979 | Margalit et al. | 429/194 |
| 4,163,829 | 8/1979 | Kronenberg | 429/194 |
| 4,279,972 | 7/1981 | Moses | 429/50 |
| 4,297,231 | 10/1981 | Kahara et al. | 429/224 X |

FOREIGN PATENT DOCUMENTS

| | | |
|---|---|---|
| 30868 | 6/1981 | European Pat. Off. . |
| 2807420 | 2/1978 | Fed. Rep. of Germany . |
| 51-45029 | of 1976 | Japan . |
| 53-101628 | of 1978 | Japan . |

OTHER PUBLICATIONS

J. Electrochemical Society, vol. 126, No. 8, 306C, Aug. 1979, Abstract No. 17/ESB.

*Primary Examiner*—Charles F. LeFevour
*Attorney, Agent, or Firm*—Cornelius F. O'Brien

[57] ABSTRACT

A nonaqueous cell comprising an active metal anode such as lithium, a manganese dioxide-containing cathode which contains less than 1 weight percent water in the manganese dioxide and a liquid organic electrolyte comprising lithium trifluoromethane sulfonate (LiCF₃SO₃) dissolved in propylene carbonate (PC) and dimethoxyethane (DME).

9 Claims, No Drawings

NONAQUEOUS CELLS EMPLOYING HEAT-TREATED MNO₂ CATHODES AND A PC-DME-LiCF₃SO₃ ELECTROLYTE

This application is a Continuation of our prior U.S. application: Ser. No. 163,497 filing date June 27, 1980 abandoned.

FIELD OF THE INVENTION

The invention relates to a nonaqueous cell utilizing a highly active metal anode, a manganese dioxide-containing cathode which contains less than about 1 percent water based on the weight of the manganese dioxide and a liquid organic electrolyte solution comprising lithium trifluoromethane sulfonate dissolved in propylene carbonate and dimethoxyethane.

BACKGROUND OF THE INVENTION

The development of high energy battery systems requires the compatibility of an electrolyte possessing desirable electrochemical properties with highly reactive anode materials, such as lithium, sodium, and the like and the efficient use of high energy density cathode materials, such as manganese dioxide. The use of aqueous electrolytes is precluded in these systems since the anode materials are sufficiently active to react with water chemically. It has therefore been necessary, in order to realize the high energy density obtainable through use of these highly reactive anodes and high energy density cathodes, to turn to the investigation of nonaqueous electrolyte systems and more particularly to nonaqueous organic electrolyte systems.

The term "nonaqueous organic electrolyte" in the prior art refers to an electrolyte which is composed of a solute, for example, a salt or complex salt of Group I-A, Group II-A or Group III-A elements of the Periodic Table, dissolved in an appropriate non-aqueous organic solvent. Conventional solvents include propylene carbonate, ethylene carbonate or γ-butyrolactone.

A multitude of solutes is known and recommended for use but the selection of a suitable solvent has been particularly troublesome since many of those solvents which are used to prepare electrolytes sufficiently conductive to permit effective ion migration through the solution are reactive with the highly active anodes mentioned above. Most investigators in this area, in search of suitable solvents, have concentrated on aliphatic and aromatic nitrogen-and oxygen-containing compounds with some attention given to organic sulfur-, phosphorus-and arsenic-containing compounds. The results of this search have not been entirely satisfactory since many of the solvents investigated still could not be used effectively with high energy density cathode materials, such as manganese dioxide ($MnO_2$), and were sufficiently corrosive to lithium anodes to prevent efficient performance over any length of time.

Although manganese dioxide has been mentioned as a cathode for cell applications, manganese dioxide inherently contains an unacceptable amount of water, both of the adsorbed and bound (absorbed) types, which is sufficient to cause anode (lithium) corrosion along with its associated hydrogen evolution. This type of corrosion that causes gas evolution is a serious problem in sealed cells, particularly in miniature type button cells. In order to maintain overall battery-powered electronic devices as compact as possible, the electronic devices are usually designed with cavities to accommodate the miniature cells as their power source. The cavities are usually made so that a cell can be snugly positioned therein thus making electronic contact with appropriate terminals within the device. A major potential problem in the use of cell-powered devices of this nature is that if the gas evolution causes the cell to bulge then the cell could become wedged within the cavity. This could result in damage to the device. Also, if electrolyte leaks from the cell it could cause damage to the device. It is therefore important that the physical dimensions of the cell's housing remain constant during discharge and that the cell will not leak any electrolyte into the device being powered. Consequently, the manganese dioxide for use in this invention has to be heat treated to lower its water content to less than 1 percent by weight as is known in the battery art.

U.S. Pat. No. 4,133,856 discloses a process for producing a $MnO_2$ electrode (cathode) for nonaqueous cells whereby the $MnO_2$ is initially heated within a range of 350° to 430° C. so as to substantially remove both the adsorbed and bound water and then, after being formed into an electrode with a conductive agent and binder it is further heated in a range of 200° to 350° C. prior to its assembly into a cell. British Pat. No. 1,199,426 also discloses the heat treatment of $MnO_2$ in air at 250° to 450° C. to substantially remove its water component.

Propylene carbonate and dimethoxyethane have been employed as solvents for a wide range of solutes as disclosed in U.S. Pat. No. 4,158,723. Specifically, this patent discloses a Li/PbO cell containing $Bi_2O_3$, $Sb_2O_3$ or $SnO_2$ additive in the PbO cathode and an electrolyte of a mixture of an ether (e.g. dimethoxyethane) and an ester (e.g. propylene carbonate) with a solute such as lithium trifluoromethane sulfonate.

While the theoretical energy, i.e., the electrical energy potentially available from a selected anode-cathode couple, is relatively easy to calculate, there is a need to choose a nonaqueous electrolyte for a couple that permits the actual energy produced by an assembled battery to approach the theoretical energy. The problem usually encountered is that it is practically impossible to predict in advance how well, if at all, a nonaqueous electrolyte will function with a selected couple. Thus a cell must be considered as a unit having three parts: a cathode, an anode, and an electrolyte, and it is to be understood that the parts of one cell are not predictably interchangeable with parts of another cell to produce an efficient and workable cell.

It is an object of the present invention to provide a nonaqueous cell employing among other components a manganese dioxide-containing cathode wherein the water content is less than 1 weight percent based on the weight of the manganese dioxide and a stable electrolyte solution of lithium trifluoromethane sulfonate dissolved in propylene carbonate and dimethoxyethane which permits excellent cathode utilization over a wide range of temperatures.

It is another object of the present invention to provide a heat-treated manganese dioxide nonaqueous cell employing a lithium anode.

It is another object of the present invention to provide a lithium/$MnO_2$ nonaqueous cell employing a liquid organic electrolyte consisting of lithium trifluoromethane sulfonate dissolved in propylene carbonate and dimethoxyethane.

SUMMARY OF THE INVENTION

The invention provides a novel high energy density nonaqueous cell comprising a highly active metal anode, a manganese dioxide-containing cathode wherein the manganese dioxide has a water content of less than 1 weight percent based on the weight of the manganese dioxide and a liquid organic electrolyte comprising lithium trifluoromethane sulfonate dissolved in propylene carbonate and dimethoxyethane. Preferably the water content should be lower than 0.5 weight percent and most preferably below about 0.2 weight percent.

The water inherently contained in both electrolytic and chemical types of manganese dioxide can be substantially removed by various treatments. For example, the manganese dioxide can be heated in air or an inert atmosphere at a temperature of 350° C. for about 8 hours or at a lower temperature for a longer period of time. Care should be taken to avoid heating the manganese dioxide above its decomposition temperature which is about 400° C. in air. In oxygen atmospheres, higher temperatures may be employed. In accordance with this invention the manganese dioxide should be heated for a sufficient period of time to insure that the water content is reduced below about 1 weight percent, preferably below about 0.5 and most preferably below about 0.2 weight percent based on the weight of the manganese dioxide. An amount of water above about 1 weight percent would react with the highly active metal anode, such as lithium, and cause it to corrode thereby resulting in hydrogen evolution. As stated above, this could result in physical distortion of the cell and/or electrolyte leakage from the cell during storage or discharge.

To effectively remove the undesirable water from $MnO_2$, or $MnO_2$ mixed with a conductive agent and a suitable binder, to the level necessary to practice this invention, it is believed necessary that both the adsorbed and bound water be substantially removed. After the water removal treatment has been completed, it is essential that the manganese dioxide be shielded to prevent adsorption of water from the atmosphere. This could be accomplished by handling the treated manganese dioxide in a dry box or the like. Alternatively, the treated manganese dioxide combined with a conductive agent and suitable binder could be heat-treated to remove water that could have been adsorbed from the atmosphere.

Preferably, the manganese dioxide should be heat-treated to remove its water content to below about 1 weight percent and then it can be mixed with a conductive agent such as graphite, carbon or the like and a binder such as Teflon (trademark for polytetrafluoroethylene), ethylene acrylic acid copolymer or the like to produce a solid cathode. If desired, a small amount of the electrolyte can be incorporated into the manganese dioxide mix.

An added possible benefit in the removal of substantially all the water from manganese dioxide is that if small amounts of water are present in the cell's electrolyte then the manganese dioxide will adsorb the main portion of that water from the electrolyte and thereby prevent or substantially delay the reaction of the water with the anode such as lithium. In this situation, the manganese dioxide will act as an extracting agent for the water impurities in the organic solvents.

The specific electrolyte of this invention PC-DME-$LiCF_3SO_3$ has been found to be an extremely stable electrolyte for lithium cells that permits excellent manganese dioxide utilization over a wide temperature range. Although there are hundreds of electrolyte solutions for use in nonaqueous cell systems, many will not provide efficient cathode utilization over a wide range of temperatures and many will not efficiently function with manganese dioxide-containing cathodes. The conductivity of electrolyte solutions decreases as the temperature decreases and thus many electolyte solutions can function efficiently only at room temperature and above. To compensate for low temperature environments, additives have sometimes been used in electrolyte solutions to render the solutions more conductive. Since nonaqueous cells are rather delicate electrochemical systems, any additives, although improving one aspect of the system, may be detrimental to another aspect of the system. The electolyte solution of the present invention has been found to efficiently work over a wide range of temperatures with heat-treated manganese dioxide cathodes and lithium anodes.

The ratio of propylene carbonate to dimethoxyethane based on the solvent volume can vary from about 80:20 to 20:80 and is preferably about 50:50. The lithium trifluoromethane sulfonate can vary from about 0.5 molar up to its saturation in the electrolyte solution and preferably is about 1 molar concentration. Generally, the conductivity should be at least $10^{-4}$ ohm$^{-1}$ cm$^{-1}$.

Highly active metal anodes suitable for this invention include lithium (Li), potassium (K), sodium (Na), calcium (Ca), magnesium (Mg), aluminum (Al), and their alloys. Of these active metals, lithium would be preferred because in addition to being a ductile, soft metal that can easily be assembled in a cell, it possesses the highest energy-to-weight ratio of the group of suitable anode metals.

EXAMPLE

Several button cells (0.165 inch high & 0.455 inch in diameter) were constucted employing a cathode consisting of 0.36 gram mix containing 86% by weight heat-treated $MnO_2$, 8.5% by weight graphite, 2% by weight acetylene black and 3.5% by weight polytetrafluoroethylene, a lithium anode (0.03 gram), a two layer separator (nonwoven polypropylene and nonwoven glass), and about 140 $\mu$l of an electrolyte consisting of about 1M $LiCF_3SO_3$ in a 50:50 volume ratio of propylene carbonate and dimethoxyethane. Each cell was discharged across a 30K-ohm load to a 2.0-volt cutoff and the mAh output was calculated. The data so obtained are shown in the Table.

TABLE

| Temperature Conditions | mAh to 2.0-volt cutoff |
|---|---|
| 21° C. | 82 |
| 35° C. | 81 |
| 0° C. | 71 |
| *21° C. | 78 |
| **21° C. | 79 |

*after storage for 3 months at 45° C.
**after storage for 1 month at 54° C.

As evident from the data shown in the Table, the specific cell system of this invention exhibited excellent manganese dioxide utilization over a wide temperature range.

What is claimed is:

1. A nonaqueous cell comprising a metal anode selected from the group consisting of lithium, potassium, sodium, calcium, magnesium, aluminum and alloys thereof, a cathode of heat-treated manganese dioxide a conductive agent and a binder, wherein the heat-treated manganese dioxide has a water content of less than 1 weight percent based on the weight of the manganese dioxide and a liquid organic electrolyte comprising lithium trifluoromethane sulfonate dissolved in propylene carbonate and a dimethoxyethane.

2. The nonaqueous cell of claim 1 wherein the volume ratio of propylene carbonate to dimethoxyethane is between about 80:20 and 20:80.

3. The nonaqueous cell of claim 2 wherein the volume ratio of propylene carbonate to dimethoxyethane is about 50:50.

4. The nonaqueous cell of claim 1, 2, or 3 wherein the concentration of the lithium trifluoromethane sulfonate in the liquid organic electrolyte varies from about 0.5 molar up to its saturation in the liquid organic electrolyte.

5. The nonaqueous cell of claim 1, 2, or 3 wherein the concentration of the lithium trifluoromethane sulfonate in the liquid organic electrolyte is about 1 molar.

6. The nonaqueous cell of claim 2 wherein the water content is less than 0.5 weight percent based on the weight of the managanese dioxide.

7. The nonaqueous cell of claim 6 wherein the water content is less than 0.2 weight percent based on the weight of the manganese dioxide.

8. The nonaqueous cell of claim 1 wherein the conductive agent is carbon or graphite and the binder is polytetrafluoroethylene or ethylene carylic acid copolymer.

9. The nonaqueous cell of claim 1 or 2 wherein said metal anode is lithium.

* * * * *

UNITED STATES PATENT AND TRADEMARK OFFICE
CERTIFICATE OF CORRECTION

PATENT NO. : 4,419,423
DATED : December 6, 1983
INVENTOR(S) : Violeta Z. Leger

It is certified that error appears in the above-identified patent and that said Letters Patent is hereby corrected as shown below:

Column 1, line 38, delete "non-aqueous" and substitute therefor --nonaqueous--.

Column 5, line 2, delete "," and substitute therefor --and--.

Column 5, line 1, after the word "dioxide" add --,--

Signed and Sealed this

Nineteenth Day of March 1985

[SEAL]

Attest:

DONALD J. QUIGG

Attesting Officer

Acting Commissioner of Patents and Trademarks